(12) United States Patent
Khon et al.

(10) Patent No.: US 11,128,107 B2
(45) Date of Patent: Sep. 21, 2021

(54) ELECTRICAL PROTECTION COMPONENT HAVING A THERMAL SHORT-CIRCUIT DEVICE

(71) Applicant: EPCOS AG, Munich (DE)

(72) Inventors: Lau Kee Khon, Johor Bahru (MY); Frank Werner, Berlin (DE)

(73) Assignee: EPCOS AG, Munich (DE)

( * ) Notice: Subject to any disclaimer, the term of this patent is extended or adjusted under 35 U.S.C. 154(b) by 438 days.

(21) Appl. No.: 15/777,619

(22) PCT Filed: Nov. 22, 2016

(86) PCT No.: PCT/EP2016/078447

§ 371 (c)(1),
(2) Date: May 18, 2018

(87) PCT Pub. No.: WO2017/097584

PCT Pub. Date: Jun. 15, 2017

(65) Prior Publication Data

US 2018/0351329 A1     Dec. 6, 2018

(30) Foreign Application Priority Data

Dec. 9, 2015     (DE) .......................... 102015121438.5

(51) Int. Cl.
*H01T 1/14*     (2006.01)
*H01C 7/12*     (2006.01)
(Continued)

(52) U.S. Cl.
CPC ................ *H01T 1/14* (2013.01); *H01C 7/12* (2013.01); *H01H 37/761* (2013.01); *H02H 3/20* (2013.01);
(Continued)

(58) Field of Classification Search
CPC .... H01T 4/00; H01T 4/02; H01T 4/04; H01T 4/08; H01T 4/10; H01T 1/14; H01T 1/15;
(Continued)

(56) References Cited

U.S. PATENT DOCUMENTS 4,034,326 A      7/1977 Hill et al.
4,396,970 A *    8/1983 Scudner, Jr. .............. H01T 4/12
                                                            361/117
(Continued)

FOREIGN PATENT DOCUMENTS

DE     19622461 A1     11/1997
DE     19708651 A1     9/1998
(Continued)

*Primary Examiner* — Thienvu V Tran
*Assistant Examiner* — Nusrat Quddus
(74) *Attorney, Agent, or Firm* — Slater Matsil, LLP

(57) ABSTRACT

An electrical protection component having a short-circuit device is disclosed. In an embodiment an electrical protection component includes a short-circuiting device including a surge arrester including electrodes and a thermal short-circuiting device including a clip, a first section of which is snapped onto the surge arrester and a second section of which comprises a short-circuiting link, wherein the short-circuiting link of the clip is spaced apart from at least one of the electrodes by a fusible element, wherein the short-circuiting link electrically conductively connects two of the electrodes to one another when the fusible element melts, and wherein the fusible element has a melting point of at least 300 degrees Celsius.

20 Claims, 2 Drawing Sheets

(51) Int. Cl.
*H01H 37/76* (2006.01)
*H02H 3/20* (2006.01)
*H02H 9/04* (2006.01)

(52) U.S. Cl.
CPC ....... H02H 9/043 (2013.01); *H01H 2037/762* (2013.01)

(58) Field of Classification Search
CPC .... H01T 1/18; H01T 1/20; H01T 1/22; H01T 1/24; H01T 2/00; H01T 2/02; H01C 7/12; H01C 7/00; H01C 7/126; H01C 7/13; H01C 7/18; H01C 7/20; H01H 37/761; H01H 2037/762; H01H 85/44; H02H 3/20; H02H 3/023; H02H 3/205; H02H 9/043; H02H 9/06; H02H 9/04; H02H 9/046; H02H 9/041; H02H 9/042; H02H 9/044; H02H 9/045; H02H 7/24; H02H 7/26

See application file for complete search history.

(56) References Cited

U.S. PATENT DOCUMENTS

| | | | |
|---|---|---|---|
| 4,866,563 A | 9/1989 | Howard et al. | |
| 4,930,039 A * | 5/1990 | Woodworth | H01C 7/12 361/117 |
| 4,984,125 A * | 1/1991 | Uwano | H01J 17/34 337/34 |
| 5,248,953 A * | 9/1993 | Honl | H01T 1/14 337/32 |
| 5,768,082 A * | 6/1998 | Lange | H01J 17/40 361/112 |
| 6,424,514 B1 * | 7/2002 | Boy | H01T 1/14 361/119 |
| 6,445,560 B1 * | 9/2002 | Bobert | H01T 1/14 361/120 |
| 6,570,090 B1 * | 5/2003 | Boy | H01T 1/22 174/50.5 |
| 7,974,063 B2 * | 7/2011 | Vo | H01T 1/14 361/129 |
| 8,203,819 B2 | 6/2012 | Bobert | |
| 8,274,775 B2 * | 9/2012 | Bobert | H01T 1/14 361/124 |
| 9,184,569 B2 | 11/2015 | Ehrhardt et al. | |
| 10,468,855 B2 * | 11/2019 | Bobert | H02H 9/041 |
| 2009/0128978 A1 | 5/2009 | Vo et al. | |
| 2012/0055586 A1 | 3/2012 | McIsaac et al. | |
| 2014/0361070 A1 | 12/2014 | Cho | |
| 2017/0324221 A1 * | 11/2017 | Bobert | H01T 4/12 |

FOREIGN PATENT DOCUMENTS

| | | |
|---|---|---|
| DE | 19907319 A1 | 8/2000 |
| DE | 102008022794 A1 | 8/2009 |
| DE | 102008035903 A1 | 2/2010 |
| DE | 102011102941 A1 | 9/2012 |
| EP | 0516922 A2 | 12/1992 |
| FR | 2670624 A1 | 6/1992 |
| JP | S59095592 U1 | 6/1984 |
| JP | S6247088 U | 3/1987 |
| JP | 2001511943 A | 8/2001 |
| JP | 2007301570 A | 11/2007 |
| JP | 2011511406 A | 4/2011 |

* cited by examiner

ELECTRICAL PROTECTION COMPONENT HAVING A THERMAL SHORT-CIRCUIT DEVICE

This patent application is a national phase filing under section 371 of PCT/EP2016/078447, filed Nov. 22, 2016, which claims the priority of German patent application 10 2015 121 438.5, filed Dec. 9, 2015, each of which is incorporated herein by reference in its entirety.

TECHNICAL FIELD

The invention relates to an electrical protection component.

BACKGROUND

A short-circuiting device allows the electrodes of a component to be electrically conductively connected, that is to say to be short-circuited. Short-circuiting mechanisms exist for two-electrode arresters and three-electrode arresters. In the case of continuous currents, the short-circuiting mechanisms can protect the arrester from continuous overloading. The short-circuiting mechanisms can have a fusible element that melts at relatively high temperatures, whereupon the central electrode of a three-electrode arrester is short-circuited with one or both side electrodes of the arrester, for example.

The short-circuiting device can have a link that connects the electrodes in the event of a short circuit. Before the short-circuiting device is triggered, the electrical connection of the electrodes can be interrupted by means of fusible plastic or polymer film, which melts due to the heating associated with the overloading when the short-circuiting device is triggered and the electrical connection between the electrodes is thus made possible. DE 10 2008 035 903 and DE 196 22 461 show protection components having short-circuiting devices for a three-electrode arrester.

A short-circuiting device for a three-electrode arrester may comprise a spring contact with two arms that is mounted on or welded to the central electrode. A thin insulating material prevents the contact of the arms and side electrodes. The thin insulating material may be a polymer film, for example. In the event of overvoltage, the insulating material under at least one of the arms melts such that a short circuit occurs between the central electrode and the side electrode.

SUMMARY OF THE INVENTION

Embodiments provide an electrical protection component having a short-circuiting device.

Embodiments provide an electrical protection component comprises a short-circuiting device including a surge arrester having electrodes and a thermal short-circuiting device, which comprises a clip, the first section of which is snapped onto the surge arrester and the second section of which has a short-circuiting link. The short-circuiting link of the clip is spaced apart from at least one of the electrodes by means of a fusible element and the short-circuiting link electrically connects two of the electrodes to one another when the fusible element melts. The fusible element has a melting point of at least 300 degrees Celsius.

In various embodiments a combination of a fusible element having a high melting temperature, for example 300 degrees Celsius or more, and a clip mechanism is provided for the protection component. The clip mechanism is suitable for withstanding the high temperatures and exerting a constant tensioning force in order to provide the short-circuiting function for the reliable short-circuiting device. A clip is an elastically deformable clamp attached to the surge arrester by means of its spring force arising from the deformation when the surge arrester is at least partially encompassed.

The protection component having such a short-circuiting device can be of small size and compact design. The protection component makes it possible to protect a surge arrester from continuous overloading by virtue of the fact that, in such a case, the fusible element melts and a short circuit occurs. The fusible element spaces the short-circuiting link apart from the electrodes and counteracts the spring force of the clip here. During melting, the spring force of the clip moves the short-circuiting link toward the electrodes; this leads to electrical contact and a short circuit. The fusible element is advantageously a solder bead. In contrast to a film, a solder bead has an extent, which extends over all three spatial directions. The shape may be spherical, ellipsoidal, disk-shaped or cuboidal, for example; however, the shape is not restricted to such basic shapes and may also be of a more complex structure.

The high melting point of the fusible element may allow the protection of components in case of AC voltage loading at relatively high currents. The high melting point of the fusible body may further allow the short-circuiting function to be triggered only at very high temperatures. The protection element is also suitable for fulfilling prescribed fuse calibration tests and specifications, for example, as part of Telcordia GR-974-CORE.

The material for a fusible element, for example, in the form of a lead-free solder bead, may comprise a combination of bismuth (Bi), tin (Sn) and antimony (Sb). The proportions may be 25-35% both bismuth and tin and 50-70% antimony. The following proportions may be advantageous in order to achieve a high melting point of the material and good mechanical properties for the solder bead: 27-31% bismuth, 27-31% tin and 46-38% antimony.

The clip may be of one-piece design, which is associated with simple manufacture. In one embodiment, the first section encompasses more than half of the circumference of the surge arrester in order to achieve secure attachment. The second section may be formed as an axial extension of the clip end such that the section spans the electrodes that are to be short-circuited.

In one embodiment of the surge arrester having a central electrode and two side electrodes arranged on an end side, the clip is snapped onto the surge arrester in the region of the central electrode. The first section advantageously has a recess with a width corresponding to the width of the central electrode. The slot-like recess allows the clip to be snapped on in such a way that the central electrode extends through the recess. The fusible element is arranged between the second section and the central electrode in order to space the short-circuiting link apart from the electrodes. The second section may have a mount for the fusible element for the secure fixing thereof.

BRIEF DESCRIPTION OF THE DRAWINGS

The invention is illustrated below with reference to drawings.

DETAILED DESCRIPTION OF ILLUSTRATIVE EMBODIMENTS

Figure 1:
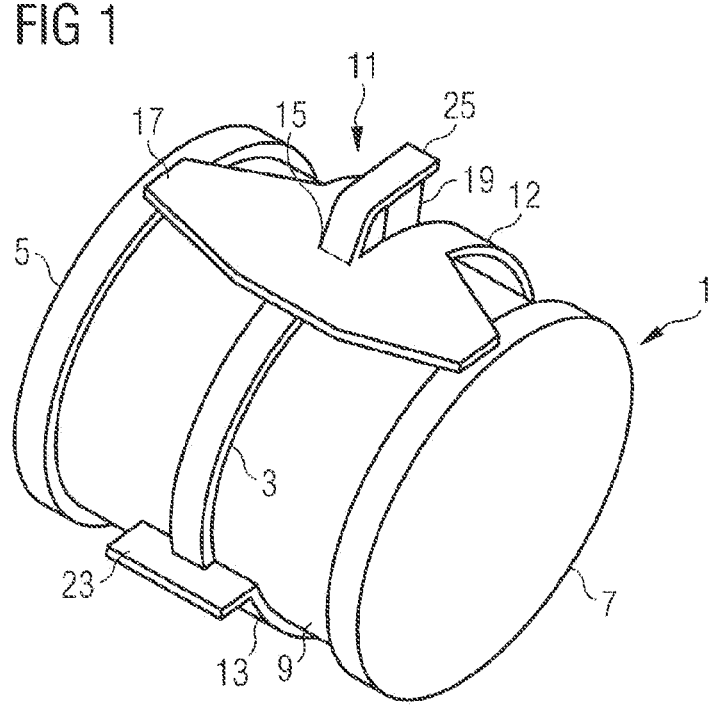
FIG. 1 shows a three-dimensional illustration of an exemplary embodiment of an electrical protection component having a short-circuiting device.
Figure 2:
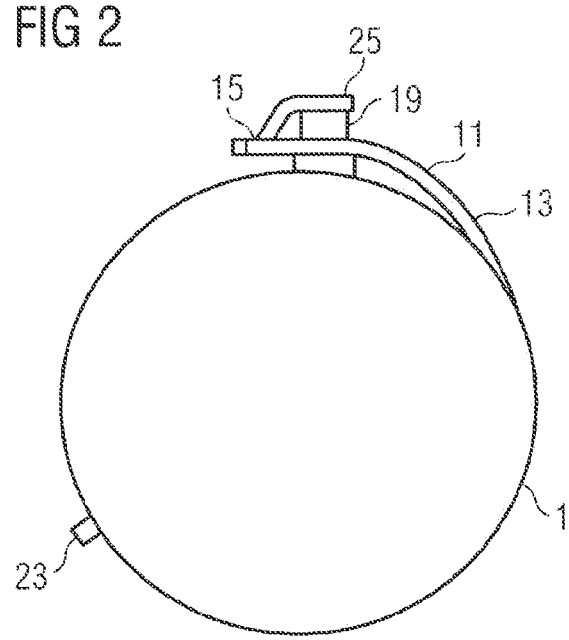
FIG. 2 shows a side view of the exemplary embodiment of the electrical protection component having a short-circuiting device.

FIG. 1 shows a three-dimensional illustration of an exemplary embodiment of an electrical protection component having a short-circuiting device. A side view of the exemplary embodiment is illustrated in FIG. 2.

The exemplary embodiment comprises a surge arrester 1, which has a central electrode 3 and two side electrodes 5, 7 arranged on an end side. The surge arrester 1 has a cylindrical body 9 made of insulating material. The electrodes 3, 5, 7 extend radially beyond the body 9. In an alternative exemplary embodiment (not illustrated), the radial extent of the side electrodes corresponds to that of the body; only the central electrode protrudes.

The thermal short-circuiting device ii comprises a clip 12 and a fusible element 19. The clip 12 has a first section 13 and a second section 15. The first section 13 is snapped onto the surge arrester 1. The second section 15 has a short-circuiting link 17, which extends between the side electrodes 5, 7 over the central electrode 3 without touching the electrodes 3, 5, 7. The fusible element 19, which is clamped between the surge arrester 1 and the short-circuiting link 17, spaces the short-circuiting link 17 apart from the electrodes 3, 5, 7 such that there is no conductive connection between them by way of the short-circuiting link 17.

Figure 3:
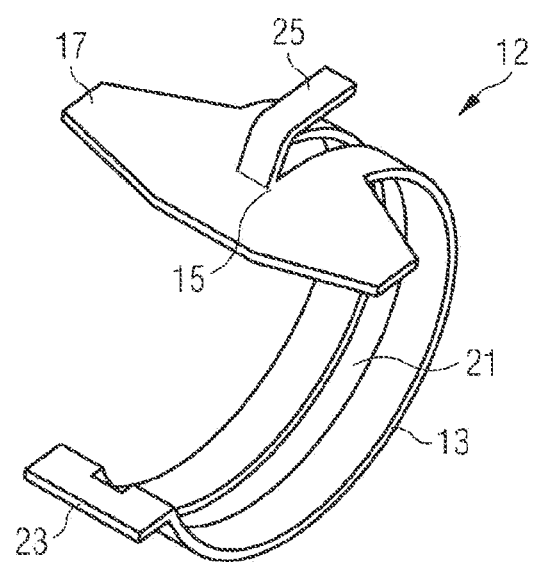
FIG. 3 shows an exemplary embodiment of a clip.

FIG. 3 shows the clip 12 of the short-circuiting device ii. The clip 12 is of one-piece design and may be formed, for example, of a stamped metal sheet. The first section 13 is snapped onto the surge arrester 1.

The first section 13 has a cross section that is substantially in the form of a section of a circle. The first section 13, apart from the ends thereof, has the shape of a slotted sleeve. The first section is suitable for encompassing more than half of the cylindrical surge arrester body 9 when the clip 12 is snapped on. The first section 13 is elastically deformable such that it clamps on the surge arrester body 9 by way of its spring force.

The first section 13 has a radially running recess 21 with a width corresponding to the width of the central electrode 3. After the snapping-on process, the central electrode 3 extends through the recess 21. This allows the clip 12 to be attached at a prescribed position, namely at the central electrode 3, and prevents the clip from sliding in the axial direction.

One end of the first section 13 is bent radially toward the outside and has a web 23, which restricts the recess 21 on this side. When the clip 12 is snapped on, the web 23 runs over the central electrode 3. The web 23 serves for stability. In an alternative exemplary embodiment (not illustrated), the first section has a recess that is open on one side, without the web 23, such that elongated regions of the clip run on both sides of the recess when the clip is snapped on both sides of the central electrode.

The second section 15 is located at the other end of the first section 13, the second section being formed by an axial widened portion of the clip end. The second section 15 has a mount for the fusible element 19. In this exemplary embodiment, the mount is designed as a tongue 25, which is formed by indentations in the second section 15 and is bent in such a way that it is suitable for pressing the fusible element 19 from above onto the central electrode 3. Alternative configurations (not illustrated), for example, blind holes or recesses in the second section, are also suitable as the mount.

Figure 4:
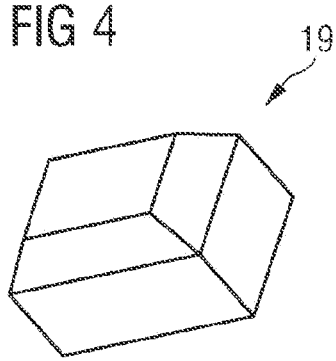
FIG. 4 shows an exemplary embodiment of a fusible element.

FIG. 4 shows an exemplary embodiment of a fusible element 19, which may also be referred to as a solder bead. The fusible element 19 has a three-dimensional structure with a significant extent in the three directions in space. The fusible element may be spherical, ellipsoidal, cuboidal or disk-shaped, for example. A combination of various ranges of shapes is also possible. The exemplary embodiment has the shape of a cuboid with an attachment in the shape of a truncated pyramid. A shape that tapers upward allows not only the fixing by way of a force acting radially on the top side of the fusible element 19, such as the tongue 25 pressing on the fusible element 19, but also by way of clamping forces with tangential components acting on the tapering region in the edge region.

The fusible element 19 has a melting point of approximately 300 degrees Celsius or more and is made of lead-free material.

The material of the fusible element 19 may comprise a combination of bismuth, tin and antimony. For example, in such a fusible element, 25-35% bismuth and 25-35% tin may be provided. The material of the fusible element advantageously comprises 27-31% bismuth and 27-31% tin and 38-46% antimony. The percent values may relate to percent values by weight or by mass.

The features of the exemplary embodiments may be combined.

The invention claimed is:

1. An electrical protection component comprising:
a short-circuiting device comprising:
a surge arrester comprising electrodes; and
a thermal short-circuiting device comprising a clip, a first section of which is snapped onto the surge arrester and a second section of which comprises a short-circuiting link,
wherein the short-circuiting link of the clip is spaced apart from at least one of the electrodes by a fusible element clamped between the surge arrester and the short-circuiting link,
wherein the short-circuiting link is configured to electrically conductively connect two of the electrodes to one another when the fusible element melts,
wherein the fusible element has a melting point of at least 300 degrees Celsius,
wherein the clip is snapped onto the surge arrester in a region of one of the electrodes having a first width, and
wherein the first section has a recess with a second width corresponding to the first width.

2. The electrical protection component according to claim 1, wherein the fusible element is a lead-free solder bead.

3. The electrical protection component according to claim 1, wherein the fusible element comprises bismuth, tin and antimony.

4. The electrical protection component according to claim 3, wherein the fusible element comprises 25-35% bismuth, 25-35% tin and 30-50% antimony.

5. The electrical protection component according to claim 3, wherein the fusible element comprises 27-31% bismuth, 27-31% tin and 38-46% antimony.

6. The electrical protection component according to claim 1, wherein the clip is one-piece.

7. The electrical protection component according to claim 1, wherein the first section encompasses more than half of a circumference of the surge arrester.

8. The electrical protection component according to claim 1, wherein the second section is formed by an axial widened portion of a clip end.

9. The electrical protection component according to claim 1, wherein the electrodes of the surge arrester comprise a central electrode and two side electrodes arranged on end sides, and wherein the clip is snapped onto the surge arrester in a region of the central electrode.

10. The electrical protection component according to claim 9, wherein the first section comprises the recess with the second width corresponding to a width of the central electrode.

11. The electrical protection component according to claim 10, wherein the fusible element is arranged between the second section and the central electrode.

12. The electrical protection component according to claim 9, wherein the short-circuiting link is spaced apart both from the central electrode and from the side electrodes.

13. The electrical protection component according to claim 1, wherein the second section comprises a mount for the fusible element.

14. An electrical protection component comprising:
a short-circuiting device comprising:
a surge arrester comprising electrodes; and
a thermal short-circuiting device comprising a clip, a first section of which is snapped onto the surge arrester and a second section of which comprises a short-circuiting link,
wherein the short-circuiting link of the clip is spaced apart from at least one of the electrodes by a fusible element that is clamped between the surge arrester and the short-circuiting link,
wherein the short-circuiting link is configured to electrically conductively connect two of the electrodes to one another when the fusible element melts,
wherein the fusible element has a melting point of at least 300 degrees Celsius,
wherein the fusible element comprises 25-35% bismuth, 25-35% tin and 30-50% antimony,
wherein the clip is snapped onto the surge arrester in a region of one of the electrodes having a first width, and
wherein the first section has a recess with a second width corresponding to the first width.

15. An electrical protection component comprising:
a short-circuiting device comprising:
a surge arrester comprising electrodes; and
a thermal short-circuiting device comprising a clip, a first section of which is snapped onto the surge arrester and a second section of which comprises a short-circuiting link,
wherein the short-circuiting link of the clip is spaced apart from at least one of the electrodes by a fusible element,
wherein the short-circuiting link is configured to electrically conductively connect two of the electrodes to one another when the fusible element melts,
wherein the second section comprises a mount for the fusible element,
wherein the clip is snapped onto the surge arrester in a region of one of the electrodes having a first width, and
wherein the first section having a recess with a second width corresponding to the first width.

16. The electrical protection component according to claim 15, wherein the fusible element comprises 25-35% bismuth, 25-35% tin and 30-50% antimony.

17. The electrical protection component according to claim 15, wherein the fusible element comprises 27-31% bismuth, 27-31% tin and 38-46% antimony.

18. An electrical protection component comprising:
a short-circuiting device comprising:
a surge arrester comprising electrodes; and
a thermal short-circuiting device comprising a clip, a first section of which is snapped onto the surge arrester and a second section of which comprises a short-circuiting link,
wherein the short-circuiting link of the clip is spaced apart from at least one of the electrodes by a fusible element,
wherein the short-circuiting link is configured to electrically conductively connect two of the electrodes to one another when the fusible element melts,
wherein the clip is snapped onto the surge arrester in a region of one of the electrodes having a first width, and
wherein the first section has a recess with a second width corresponding to the first width.

19. The electrical protection component according to claim 18, wherein the fusible element comprises 25-35% bismuth, 25-35% tin and 30-50% antimony.

20. The electrical protection component according to claim 18, wherein the fusible element comprises 27-31% bismuth, 27-31% tin and 38-46% antimony.

* * * * *